(12) United States Patent
Kuwabara et al.

(10) Patent No.: US 6,918,943 B2
(45) Date of Patent: Jul. 19, 2005

(54) MACHINING TOOL AND METHOD OF PRODUCING THE SAME

(75) Inventors: Mitsuo Kuwabara, Tsurugashima (JP); Masanori Ohtsuka, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 11 days.

(21) Appl. No.: 10/450,680

(22) PCT Filed: Dec. 12, 2001

(86) PCT No.: PCT/JP01/10887
§ 371 (c)(1),
(2), (4) Date: Jun. 17, 2003

(87) PCT Pub. No.: WO02/49988
PCT Pub. Date: Jun. 27, 2002

(65) Prior Publication Data
US 2004/0028488 A1 Feb. 12, 2004

(30) Foreign Application Priority Data
Dec. 19, 2000 (JP) ........................................ 2000-385268
Aug. 3, 2001 (JP) ........................................ 2001-236925

(51) Int. Cl.[7] ............................. B22F 3/12; C22C 29/00
(52) U.S. Cl. ............................. 75/236; 75/238; 419/13; 419/14; 419/27; 419/53; 419/57; 428/547
(58) Field of Search ........................ 75/236, 238, 230; 419/13, 14, 27, 53, 57, 10; 428/547

(56) References Cited

U.S. PATENT DOCUMENTS

| | | | | |
|---|---|---|---|---|
| 4,830,930 A | * | 5/1989 | Taniguchi et al. | 428/547 |
| 5,181,953 A | * | 1/1993 | Nakano et al. | 75/237 |
| 5,248,352 A | * | 9/1993 | Nakahara et al. | 148/421 |
| 5,494,635 A | * | 2/1996 | Bennett | 419/14 |
| 5,694,639 A | * | 12/1997 | Oskarsson et al. | 419/16 |
| 5,761,593 A | * | 6/1998 | Ostlund et al. | 419/29 |
| 6,090,343 A | * | 7/2000 | Kear et al. | 419/45 |

FOREIGN PATENT DOCUMENTS

| | | |
|---|---|---|
| EP | 0 635 580 A | 1/1995 |
| WO | WO 00 50657 A | 8/2000 |

* cited by examiner

*Primary Examiner*—Ngoclan T. Mai
(74) *Attorney, Agent, or Firm*—Birch, Stewart, Kolasch & Birch, LLP (57) ABSTRACT

A machining surface of a machining tool such as a drill is composed of a metal-rich section. A ceramics-rich section is formed centrally in the drill. Further, a gradient section is provided between the ceramics-rich section and the metal-rich section. In the gradient section, the composition ratio of metal is gradually increased from the ceramics-rich section to the metal-rich section. That is, the drill is composed of the gradient composite material in which the composition ratio of ceramics is increased and the composition ratio of metal is decreased inwardly from the machining surface.

10 Claims, 6 Drawing Sheets

MACHINING TOOL AND METHOD OF PRODUCING THE SAME

This application is the national phase under 35 U.S.C. § 371 of PCT International Application No. PCT/JP01/10887 which has an International filing date of Dec. 12, 2001, which designated the United States of America.

TECHNICAL FIELD

The present invention relates to a machining tool and a method of producing the same. According to the present invention, the machining tool is formed of a gradient composite material in which composition ratios of metal and ceramics change inwardly from the surface of the machining tool.

BACKGROUND ART

In making a hole or a bore in a workpiece, firstly, boring machining is roughly performed for the workpiece using a drill, and then, cutting machining is performed using a reamer.

Constitutive materials adopted for the drill or the reamer include, for example, SK material, SKD material, or SKH material defined by Japan Industrial Standard (so-called high speed tool steel) containing high carbon steel as a major component, super alloy material such as nickel-based alloy and cobalt-based alloy, and superhard material as composite material of ceramics and metal. In order to improve abrasion resistance, the surface of the drill or the reamer is sometimes coated with a coating film of hard ceramics such as TiC or TiN.

The high speed tool steel and the super alloy material have high strength and high toughness. However, the high speed tool steel and the super alloy do not have sufficient abrasion resistance, compressive strength, and rigidity. The superhard material has high abrasion resistance, compressive strength, and rigidity. However, the superhard material does not have sufficient toughness and tends to cause cracks and breakage. That is, the characteristics of the high speed tool steel and the super alloy material are opposite to the characteristics of the superhard material. Therefore, the constitutive material for the drill or the reamer is selected in consideration of the constitutive material of a workpiece and the magnitude of a variety of stresses exerted on the drill or the reamer when the boring machining or the cutting machining is performed. Such stresses include compressive stress exerted when the pressing force is applied to the workpiece, tensile stress acting on the leading part and the cutting part, and tensile stress exerted between the portion to be machined and the portion not to be machined.

It is desirable that the drill or the reamer has high hardness, high strength, and high toughness. High hardness, i.e., high abrasion resistance is essential for a long service life. High strength helps to prevent deformation of the drill or the reamer, even if the stresses as described above are exerted thereon. Further, the drill or the reamer having high toughness scarcely suffers from the occurrence of cracks and breakage. However, conventional drills or reamers do not have all of the characteristics described above.

For example, in the case of the drill or the reamer composed of a superhard material, it is possible to improve toughness by increasing the composition ratio of metal. However, the superhard material having high metal composition ratio does not have high hardness and strength. Therefore, the service life of the drill or the reamer may not be long. In contrast, it is possible to improve hardness and strength by decreasing the composition ratio of metal at the sacrifice of toughness. However, the cracks and breakage tend to occur more frequently.

As described above, the superhard material having high hardness and strength does not have high toughness. The superhard material having high toughness does not have high hardness and strength. Therefore, it is difficult to improve all of the characteristics (hardness, strength, and toughness) of the drill or the reamer.

DISCLOSURE OF INVENTION

The present invention has been made in order to solve the problem as described above, and an object of which is to provide a machining tool which has a long service life in which deformation, cracks and breakage scarcely occur, and a method of producing the machining tool.

In order to achieve the above object, according to the present invention, a machining tool is composed of a composite material containing ceramics and metal, wherein a composition ratio of the ceramics is increased and a composition ratio of the metal is decreased inwardly from a surface of the machining tool.

The machining tool constructed as described above has toughness of metal, and hardness and strength of ceramics. Therefore, the cracks and the breakage scarcely occur, abrasion resistance is improved, and the deformation scarcely occurs.

Suitable ceramics materials used for the machining tool include at least one selected from the group consisting of carbide, nitride, and carbonitride of W, Cr, Mo, Ti, V, Zr, Hf, and lanthanoid. Suitable metal materials used for the machining tool include at least one selected from the group consisting of Fe, Ni, Co, and alloy composed of two or more of these metals. Additionally, the metal may further contain at least one of Cr, Mn, V, and Ti.

In this case, the composition ratio of ceramics to the composition ratio of metal is 85:15 to 95:5 by weight. If the metal is less than 5 parts by weight, the cracks and breakage tend to occur, because the toughness is poor. If the metal exceeds 15 parts by weight, hardness and strength, and abrasion resistance are poor. Therefore, the deformation tends to occur when a workpiece is machined.

It is preferable that the machining surface of the machining tool has Vickers hardness of not less than 1700 for prolonging the service life of the machining tool and improving the accuracy of machining the workpiece.

Drills and reamers are preferable examples of the machining tool.

According to another aspect of the present invention, a method of producing a machining tool in which a composition ratio of ceramics is increased and a composition ratio of metal is decreased inwardly from a surface of the machining tool is provided. The method comprises the steps of:

forming a compact using mixed powder comprising ceramics powder and metal powder;

sintering said compact to prepare a porous member (primary sintering step);

impregnating the porous member with a catalyst-containing solution; and resintering said porous member impregnated with the catalyst-containing solution in an atmosphere of nitriding gas to prepare a dense sintered product (secondary sintering step), wherein the nitriding gas is introduced into a furnace at the beginning of raising temperature of the furnace in the resintering step.

In this procedure, in the secondary sintering step, the metal grains existing in the vicinity of the surface of the porous member start the grain growth earlier than the ceramics grains. Further, the grain growth of the ceramics grains existing in the vicinity of the surface of the porous member is suppressed by the nitriding gas such as nitrogen, because the nitriding gas generally inhibits the grain growth of the ceramic gains. The grain growth of the ceramics grains existing centrally in the porous member is not suppressed, because the nitriding gas hardly exists centrally in the porous member. Further, the grain growth of the ceramics grains in the porous member is accelerated by the catalyst.

For the reason as described above, the metal grains are concentrated in the vicinity of the surface. In this manner, it is possible to obtain the gradient composite material in which the composition ratio of the metal is decreased and the composition ratio of the ceramics is increased inwardly from the surface.

In order to provide the machining tool having sufficient hardness, strength, and toughness for boring and cutting a workpiece, it is preferable that the ceramics grains are composed of at least one selected from the group consisting of carbide, nitride, and carbonitride of W, Cr, Mo, Ti, V, Zr, Hf, and lanthanoid, and the metal grains are composed of at least one selected from the group consisting of Fe, Ni, Co, and alloy comprising two or more of these metals. Further, at least one of Cr, Mn, V, and Ti may be added to the metal grains.

In this case, the composition ratio of ceramics and metal is 85:15 to 95:5 by weight. If the metal is less than 5 parts by weight, the cracks and breakage tend to occur, because toughness is poor. If the metal exceeds 15 parts by weight, hardness and strength, and abrasion resistance are poor. Therefore, the deformation tends to occur when a workpiece is machined.

Fe, Ni, Co, Mn, Cr, Mo, Ti, or lanthanoid are preferable examples of the catalyst in the catalyst-containing solution.

The nitriding gas is preferably nitrogen, for example, since it is easy to handle the gas and it is easy to control the reaction velocity.

The above and other objects, features, and advantages of the present invention will become more apparent from the following description when taken in conjunction with the accompanying drawings in which a preferred embodiment of the present invention is shown by way of illustrative example.

BEST MODE FOR CARRYING OUT THE INVENTION

Preferred embodiments of the machining tool and the method of producing the same according to the present invention will be described in detail with reference to the accompanying drawings.

Figure 1:
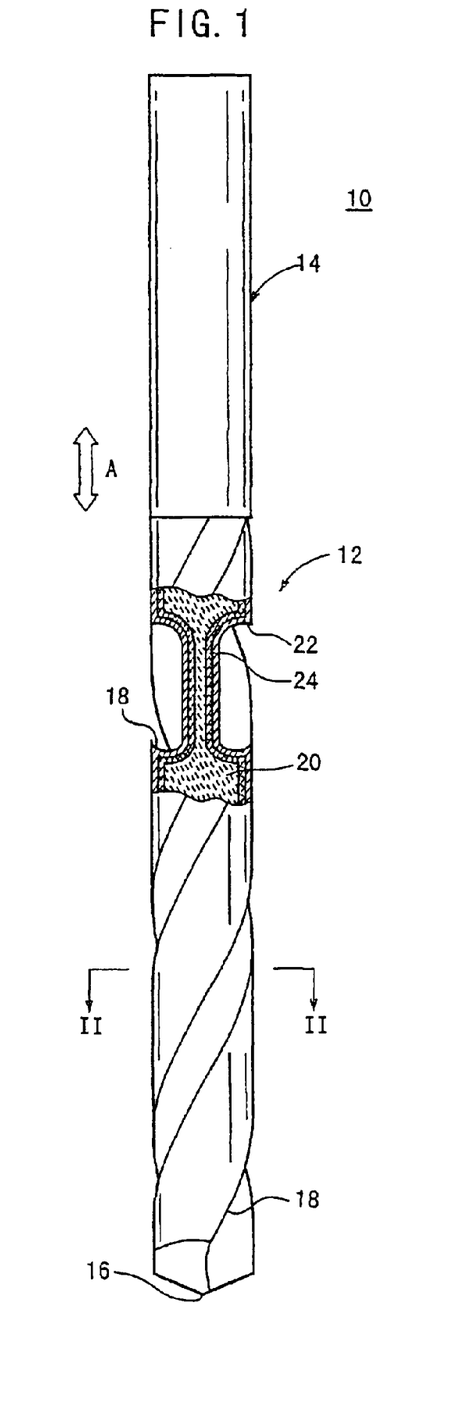
FIG. 1 is a view schematically showing, with partial longitudinal section, the overall structure of a machining tool (drill) according to a first embodiment of the present invention.

FIG. 1 schematically shows, with partial longitudinal section, the overall structure of a drill 10 as a machining tool according to a first embodiment of the present invention. The drill 10 is a twist drill having an edge section 12 and a shank section 14. The edge section 12 and the shank section 14 are formed integrally into one unit. The edge section 12 includes two cutting edges 18 extending from an edge tip 16 in the axial direction (direction of the arrow A) with a predetermined twisting angle.

Figure 2:
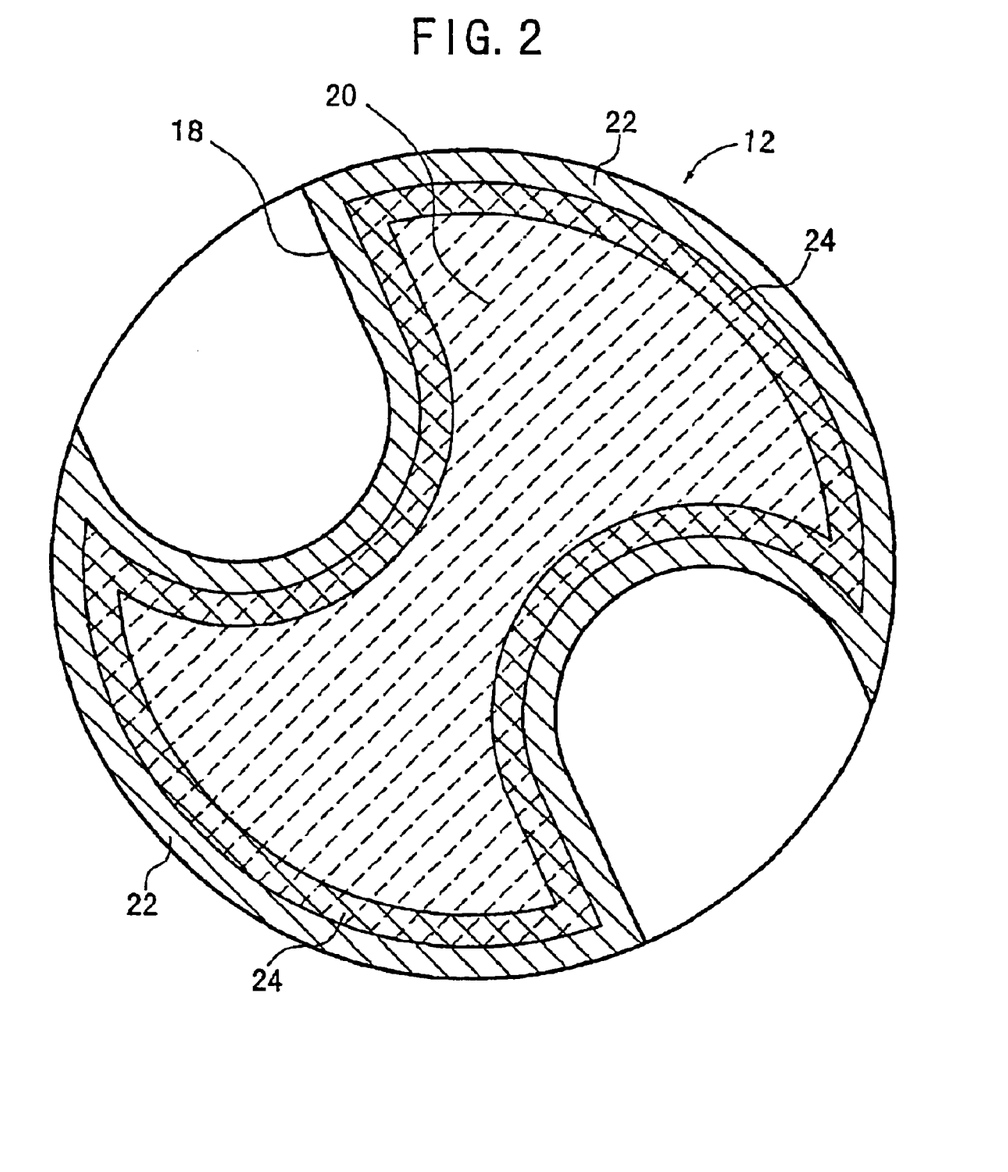
FIG. 2 is a cross sectional view as viewed along a line II—II indicated by arrows shown in FIG. 1.

FIG. 2 is a cross sectional view as viewed along a line II—II indicated by arrows shown in FIG. 1. As shown in FIG. 2, the drill 10 comprises three sections of different composition ratios. In an inner ceramics-rich section 20, the composition ratio of ceramics is relatively large. In an outer metal-rich section (the surface of the drill 10) 22, the composition ratio of metal is relatively large. A gradient section 24 is disposed between the ceramics-rich section 20 and the metal-rich section 22. In the gradient section 24, the composition ratio of metal gradually increases outwardly from the ceramics-rich section 20 to the metal-rich section 22.

In the drill 10, the composition ratio of metal is highest in the metal-rich section 22 constituting the machining surface, and the ratio decreases inwardly. In contrast, the composition ratio of ceramics is lowest in the metal-rich section 22 constituting the machining surface, and the ratio increases inwardly. That is, the drill 10 is composed of the gradient composite material in which the composition ratio of metal decreases and the composition ratio of ceramics increases inwardly from the surface.

Suitable ceramics materials used for the drill 10 include at least one selected from the group consisting of carbide, nitride, and carbonitride of W, Cr, Mo, Ti, V, Zr, Hf, and lanthanoid.

Suitable metal materials used for the drill 10 include at least one selected from the group consisting of Fe, Ni, Co, and alloy composed of two or more of these metals. Additionally, the metal may further contain at least one of Cr, Mn, V, and Ti. When the ceramics and the metal as described above are used as the constitutive materials, it is possible to form the drill 10 having sufficient strength, hardness, and toughness for performing boring machining.

When the above ceramics and metal are used as the constitutive materials for the drill 10, the composition ratio of ceramics and metal is 85:15 to 95:5 (weight ratio). If the metal is less than 5 parts by weight, the cracks and breakage tend to occur, because toughness is poor. If the metal exceeds 15 parts by weight, hardness and strength, and abrasion resistance are poor. Therefore, the deformation tends to occur when a workpiece is machined.

It is preferable that the machining surface of the drill 10 has Vickers hardness (Hv) of not less than 1700. If Hv is less than 1700, the service life of the drill 10 may not be long, because hardness is poor. Further, in this case, the coefficient of friction ($\mu$) between the workpiece and the drill 10 is high. As a result, heat and stress generated during boring machining are increased. Therefore, the surface of the workpiece tends to be machined inaccurately. In order to ensure the accuracy of machining the surface of the workpiece and the long service life of the drill 10, it is preferable that Hv is not less than 1750.

Figure 3:
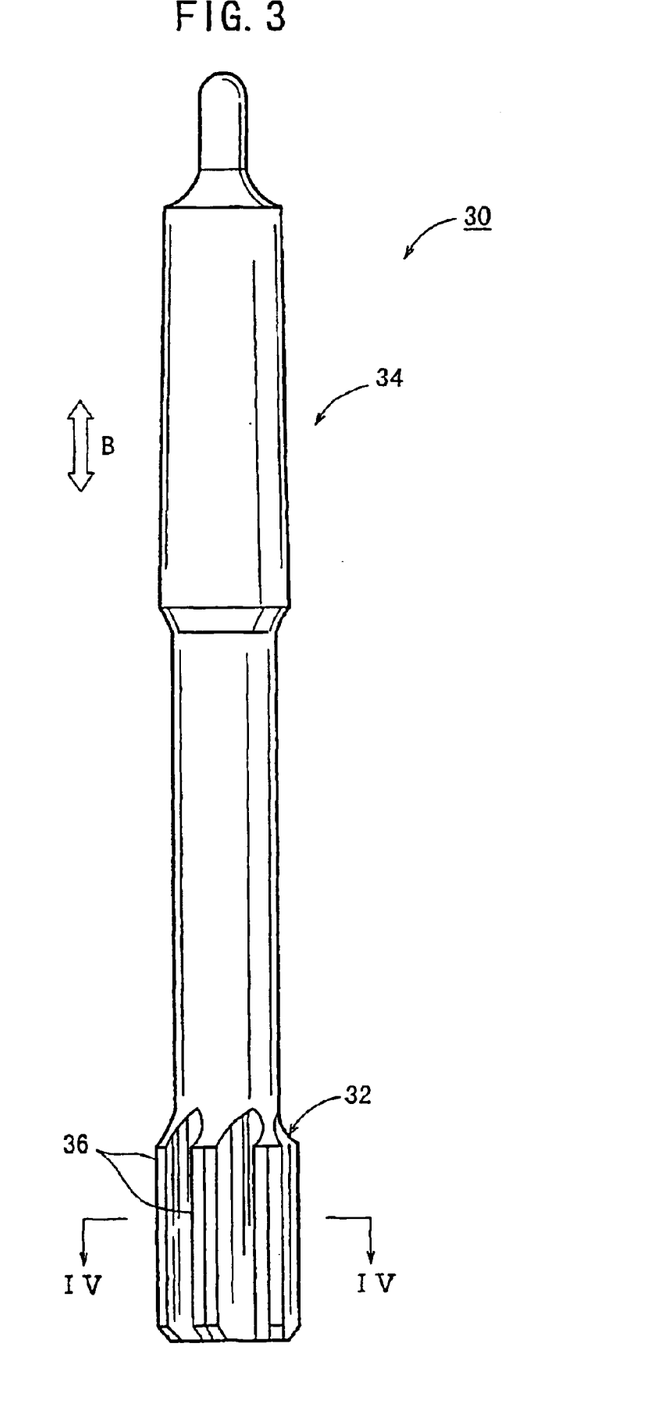
FIG. 3 is a view schematically showing the overall structure of a machining tool (reamer) according to a second embodiment of the present invention.

Next, FIG. 3 schematically shows the overall structure of a reamer 30 as a machining tool according to a second embodiment of the present invention.

The reamer 30 comprises an edge section 32 and a shank section 34. The edge section 32 and the shank section 34 are formed integrally into one unit. The edge section 32 includes six cutting edges 36 extending in the axial direction (direction of the arrow B).

Figure 4:
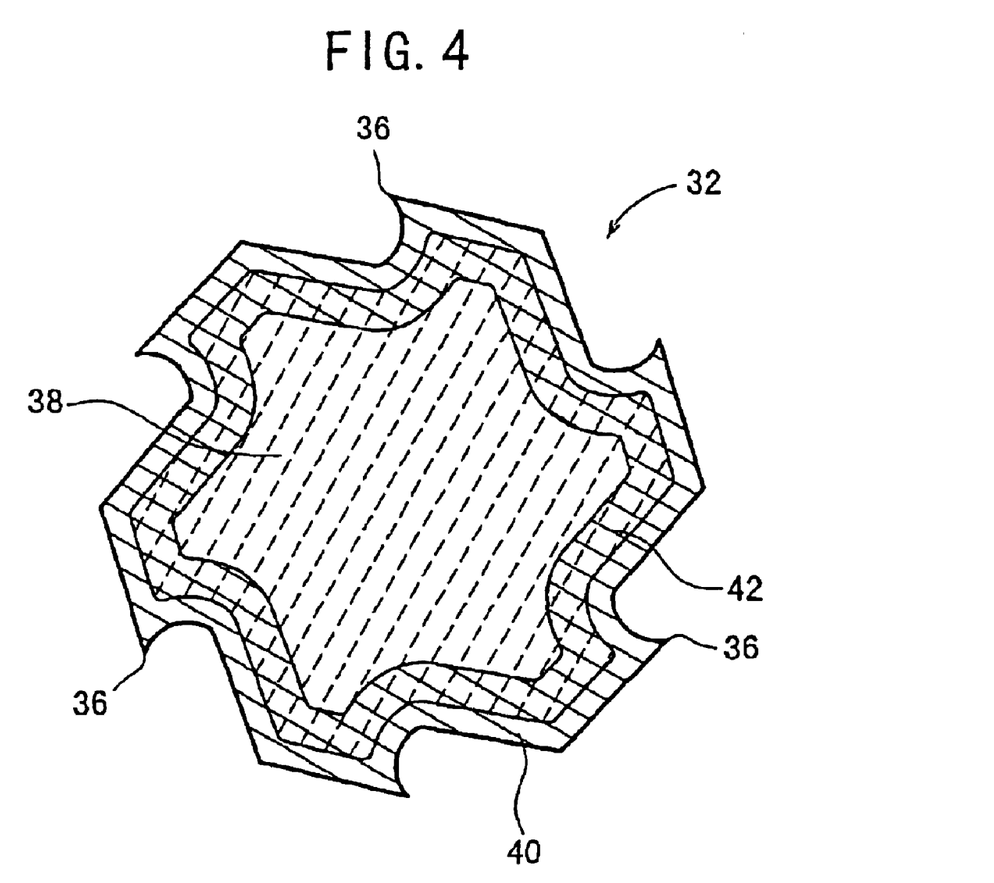
FIG. 4 is a cross sectional view as viewed along a line IV—IV indicated by arrows shown in FIG. 3.

FIG. 4 is a cross sectional view as viewed along a line IV—IV indicated by arrows shown in FIG. 3. As shown in FIG. 4, the reamer 30 comprises three sections (an inner ceramics-rich section 38, a gradient section 42, and an outer metal-rich section 40) of different composition ratios.

In the gradient section 42, the composition ratio of metal gradually increases outwardly from the ceramics-rich section 38 to the metal-rich section 40. That is, the reamer 30 is composed of the gradient composite material in which the composition ratio of metal decreases and the composition ratio of ceramics increases inwardly from the surface as described above in connection with the drill 10.

The ceramics and metal used for the reamer 30 may be exemplified by the non-oxide ceramics and the metal as described above. Also in this case, when the composition ratio of the ceramics and metal is 85:15 to 95:5, it is possible to form the reamer 30 having sufficient strength, hardness, and toughness for performing cutting machining. As described above in connection with the drill 10, it is preferable that Hv of the machining surface is not less than 1750.

In the drill 10 and the reamer 30 as described above, toughness is high at the surface (in the outer section), and hardness and strength are high in the inner section. That is, all of the hardness, strength, and toughness are sufficient when the workpiece is subjected to boring machining or cutting machining. Therefore, the service life is long, the deformation scarcely occurs, and the cracks and breakage scarcely occur.

Figure 5:
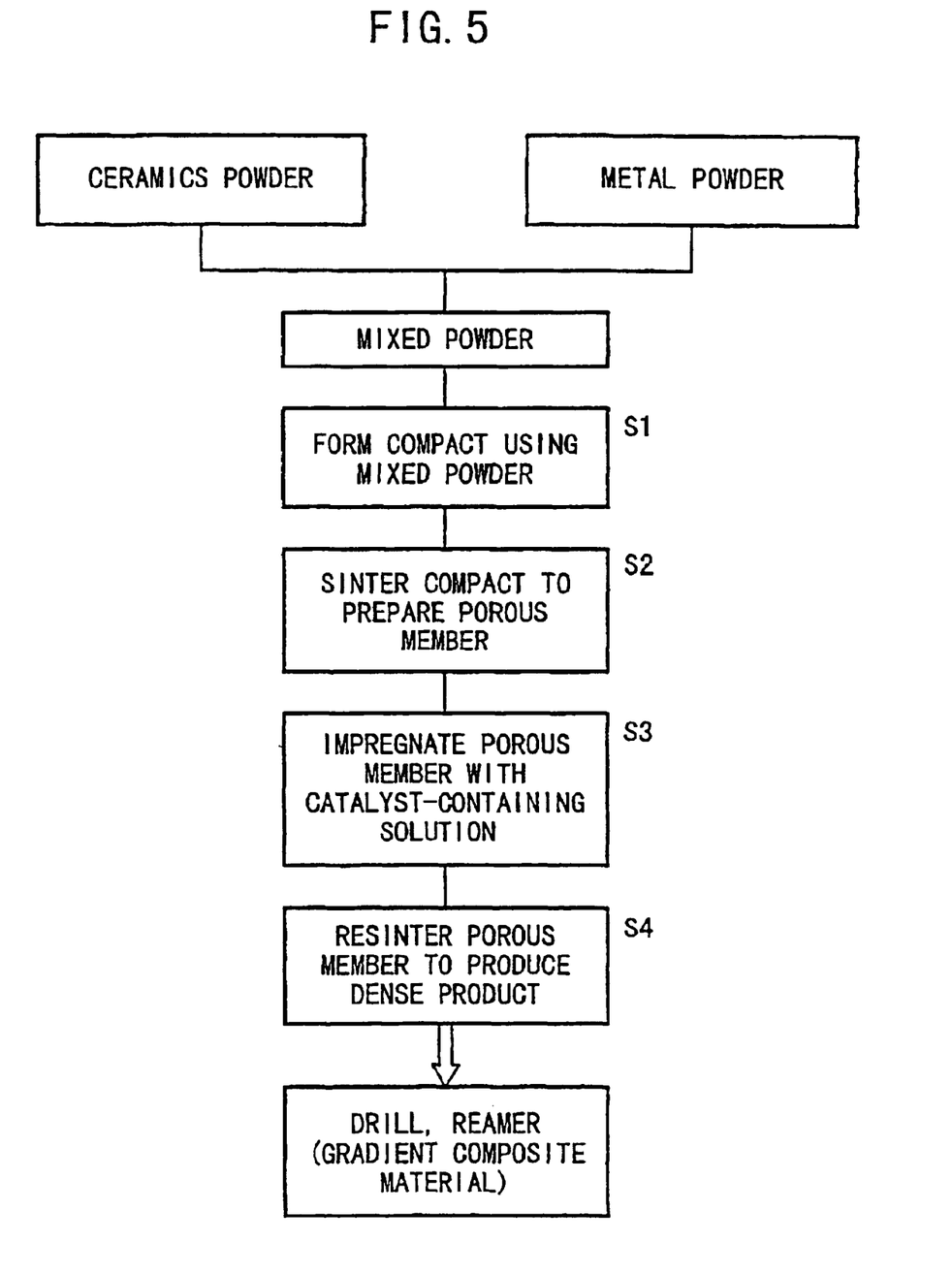
FIG. 5 is a flow chart illustrating a method of producing the machining tool according to the embodiments of the present invention.

The drill 10 and the reamer 30 can be produced in accordance with a method shown in a flow chart in FIG. 5. As shown in FIG. 5, the production method comprises a sintering step S1 of obtaining a compact, a primary sintering step S2 of sintering the compact to prepare a porous member, an impregnating step S3 of impregnating the porous member with a catalyst-containing solution, and a secondary sintering step S4 of resintering the porous member to prepare a dense sintered product.

For the reason as described above, it is preferable to use ceramics powder of at least one selected from the group consisting of carbide, nitride, and carbonitride of W, Cr, Mo, Ti, V, Zr, Hf, and lanthanoid. Further, it is preferable to use metal powder of at least one selected from the group consisting of Fe, Ni, Co, and alloy comprising two or more of these metals. Further, at least one of Cr, Mn, V, and Ti may be added. The composition ratio of ceramics powder and metal powder (ceramics powder: metal powder) in the mixed powder is in the range of 85:15 to 95:5.

A forming load is applied to the mixed powder to prepare the compact having a shape corresponding to the drill 10 or the reamer 30. In this process, the forming load is determined such that the metal powder does not cause any plastic deformation, in order to obtain the porous member in the primary sintering step as described later on. Specifically, it is preferable that the forming load is about 100 to 300 MPa.

In this case, the occurrence of plastic deformation of the metal powder is successfully avoided, and hence open pores of the compact are not closed.

Subsequently, in the primary sintering step S2, the compact is sintered into the porous member such that the pores remain open. If a dense sintered product is prepared at this stage, it is difficult to impregnate the dense sintered product with the catalyst-containing solution in the impregnating step S3.

Therefore, the sintering temperature and the time in the primary sintering step S2 are determined such that only the metal grains are fused to one another, and the sintering process is finished when necks are formed between the metal grains. In the primary sintering step S2, the ceramics grains are not fused to one another. Accordingly, the volume is not changed significantly in the process in which the compact is converted into the porous member.

Subsequently, in the impregnating step S3, the porous member is impregnated with the catalyst-containing solution. Specifically, the porous member is immersed in the catalyst-containing solution. As a result of the immersion, the catalyst-containing solution permeates into the porous member via the open pores.

In the secondary sintering step S4, any catalyst which suitably facilitates the growth of the ceramics grains can be used, including, but not limited to, Fe, Ni, Co, Mn, Cr, Mo, Ti, and lanthanoid. Those usable as the catalyst-containing solution include a solution obtained by dissolving a metal salt containing the metal as described above in a solvent, and an organic metal solution.

In this procedure, the catalyst is dispersed or dissolved in the solvent, and dissociated into single molecules or ions. Therefore, in the impregnating step S3, the catalyst, which is dissociated into single molecules or ions, is uniformly dispersed in the porous member. Accordingly, the grain growth of the ceramics grains in the secondary sintering step S4 is facilitated inwardly from the surface, in the porous member.

After the impregnating step S3, the catalyst-containing solution is left to stand, and dried naturally. Alternatively, the porous member may be heated to dry the catalyst-containing solution.

Finally, in the secondary sintering step S4, the porous member is resintered in a nitrogen atmosphere to prepare the dense sintered product. The nitriding gas, which is used as the atmosphere, is introduced into a furnace at the beginning of raising temperature of the furnace in the secondary sintering step S4. Accordingly, the dense sintered product (gradient composite material), i.e., the drill 10 or the reamer 30 as the product, in which the composition ratio of ceramics and metal is 85:15 to 95:5, is obtained.

In the secondary sintering step S4, the grain growth of the ceramics grains existing in the vicinity of the surface of the porous member is inhibited by the nitriding gas as the atmosphere. The nitriding gas is hardly introduced into the porous member. Therefore, the degree of inhibition of the grain growth of the ceramics grains existing in the porous member by the nitriding gas is small as compared with the surface. Further, the grain growth of the ceramics grains existing in the porous member is facilitated by the catalyst.

Consequently, in the secondary sintering step S4, the grain growth of the ceramics grains is suppressed in the vicinity of the surface of the porous member, and the grain growth is facilitated in the porous member. As a result, the metal grains are rearranged such that the metal grains are concentrated in the vicinity of the surface. That is, in the resulting gradient composite material, the composition ratio of the metal is high in the vicinity of the surface of the porous member, and the composition ratio of the ceramics is high in the porous member.

As described above, it is possible to increase the degree of the grain growth of the ceramics grains existing in the porous member impregnated with the catalyst-containing solution as compared with the portion located in the vicinity of the surface, in the secondary sintering step S4 by introducing the nitriding gas atmosphere at the beginning of raising temperature. Thus, rearrangement of the metal grains occurs. Accordingly, it is possible to obtain the gradient composite material (drill 10 or reamer 30) in which the composition ratio of metal is decreased and the composition ratio of the ceramics is increased inwardly from the surface.

Since the composition ratio of metal is relatively high in the vicinity of the surface of the drill 10 or the reamer 30 obtained as described above, it is possible to grind the surface of the drill 10 or the reamer 30 for improving dimensional accuracy. That is, the thickness of the ceramics-rich section 20, 38 having high hardness and high strength is remarkably increased in the drill 10 or the reamer 30 after the grinding machining. On the other hand, the metal-rich section 22, 40 remains in the vicinity of the surface of the drill 10 or the reamer 30. Therefore, it is possible to obtain the drill 10 or the reamer 30 having sufficient toughness, hardness, and strength.

In the embodiment of the present invention, the forming step S1 and the primary sintering step S2 are performed separately. Alternatively, the both steps S1, S2 may be performed simultaneously, for example, by hot isostatic pressing (HIP).

EXAMPLES

Mixed powder was prepared by mixing, in a wet manner, 90 parts by weight of tungsten carbide (WC) powder having an average grain size of 1 $\mu$m, 2 parts by weight of tantalum carbide (TaC) having an average grain size of 2 $\mu$m, 1 part by weight of niobium carbide (NbC) having an average grain size of 3.5 $\mu$m, and 7 parts by weight of cobalt (Co) having an average grain size of 1.4 $\mu$m with hexane. Subsequently, the mixed powder was formed to have a shape corresponding to a drill 10 with a pressurizing force of 120 MPa by means of the isostatic pressing method in a mold. An obtained compact was maintained at 900° C. for 30 minutes to prepare a porous member.

Subsequently, the porous member was immersed in an Ni ion solution having a concentration of 10% for 3 minutes. Thus, the Ni ion was dispersed in the porous member. Then, the porous member was left for an hour at 90° C., and dried.

Subsequently, the porous member was resintered for 1 hour and 20 minutes at 1400° C. in a nitrogen atmosphere. Thus, the drill 10 (gradient composite material) having a diameter of 12 mm, an overall length of 100 mm, a length of an edge section 12 of 60 mm was obtained as a dense sintered product. The nitrogen was introduced into a furnace at the time of raising temperature of the furnace.

The obtained drill 10 was cut for observation with an electron microscope. It was found that grains of ceramics grains existing at the surface were round and fine, while ceramics grains existing centrally in the drill 10 were greatly subjected to grain growth.

Figure 6:
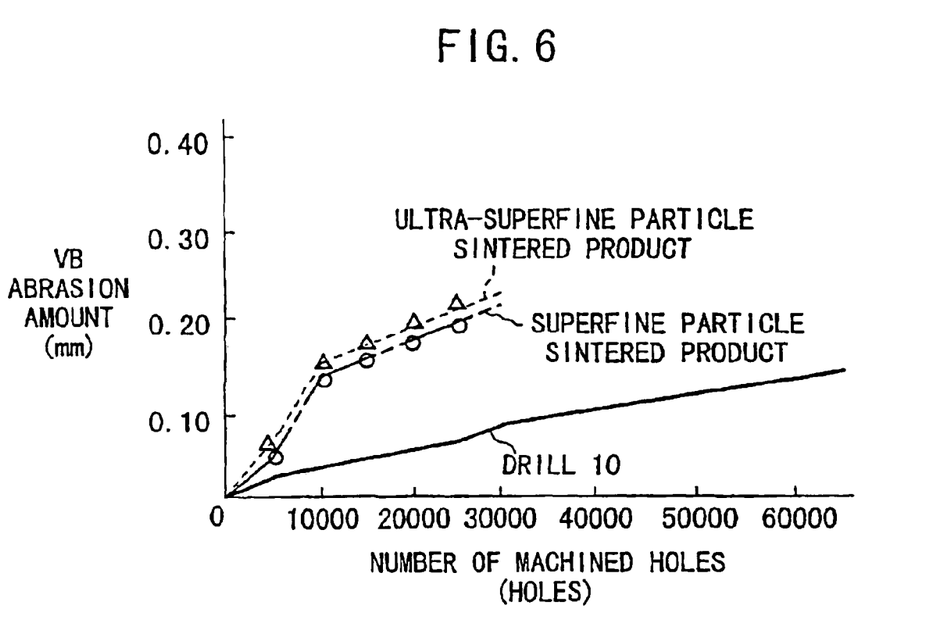
FIG. 6 is a graph illustrating the relationship between the number of machined holes and the VB abrasion amount, obtained by using the drill according to the first embodiment and commercially available drills.

Holes each having a depth of 40 mm were successively formed at a boring speed of 500 m/minute for an AC8B material (high silicon aluminum alloy) using the drill 10, a commercially available drill composed of superfine particle sintered product with a grain diameter of ceramics grain as a raw material of about 0.6 to 0.8 $\mu$m, and a drill composed of ultra-superfine particle sintered product with a grain diameter of ceramics grain as a raw material of less than about 0.4 $\mu$m to observe the relationship between the number of machined holes and the VB abrasion amount. A result of the observation is shown in FIG. 6. In FIG. 6, it is clear that the drill 10 is extremely excellent in abrasion resistance, and the drill 10 has a long service life, as compared with the both commercially available products.

In the case of the both commercially available products, a built-up edge was formed before 10,000 holes were machined. As a result, the dimensional accuracy of the hole was also lowered. On the other hand, in the case of the drill 10, no formation of built-up edge was found even after 60,000 holes were machined. The holes were successfully formed accurately.

In the same manner, a reamer 30 (gradient composite material) having a diameter of 15 mm, an overall length of 90 mm, a length of an edge section 32 of 30 mm was obtained. When the cut surface of the reamer 30 was observed with an electron microscope, it was also found for the reamer 30 that ceramics grains existing at the surface were fine and round and ceramics grains existing in the reamer 30 were greatly subjected to grain growth. A ceramics-rich section 38 was formed over a range of a depth of 5 mm from the surface.

The holes formed in the AC8B material were subjected to cutting machining using the reamer 30, a commercially available reamer composed of superfine particle sintered product, and a reamer composed of ultra-superfine particle sintered product to observe the relationship between the number of machined holes and the VB abrasion amount. In the case of the both commercially available products, the VB abrasion amount was about more than 0.2 mm when 30,000 holes were machined. In the case of the reamer 30, the VB abrasion amount was less than 0.15 mm even after 60,000 holes were machined. Further, in the commercially available products, a built-up edge was formed before 10,000 holes were machined. In the reamer 30, the formation of built-up edge was not found even after 60,000 holes were machined. The holes were successfully formed accurately.

As described above, it is clear that the drill 10 and the reamer 30 have the extremely excellent abrasion resistance as compared with the commercially available products, and hence the drill 10 and the reamer 30 have the long service lives.

The built-up edge was not formed in the drill 10 and the reamer 30 because their machining surfaces are composed of the ceramics-rich sections 20, 38. That is, the composition ratio of the metal is small in the vicinity of the machining surface, and hence mutual reaction with the AC8B material as the workpiece is remarkably suppressed during boring machining or cutting machining.

As described above, the machining tool according to the present invention is composed of the gradient composite material in which the composition ratio of the metal is decreased and the composition ratio of the ceramics is increased inwardly from the surface. Therefore, the machining tool according to the present invention has high hardness and strength as well as high toughness. Accordingly, the machining tool has the long service life, and the deformation scarcely occurs, because the machining tool is excellent in abrasion resistance. Further, the cracks and breakage scarcely occur. Furthermore, it is also possible to improve machining accuracy.

In the method of producing the machining tool according to the present invention, the porous member impregnated with the catalyst-containing solution is resintered in the nitrogen atmosphere to prepare the cutting machining tool (gradient composite material). In this procedure, the grain growth of the ceramics grains existing in the vicinity of the surface of the porous member are suppressed with the nitrogen, while the grain growth of the ceramics grains existing in the porous member are facilitated with the catalyst. Accordingly, the metal grains are concentrated at the surface. Therefore, it is possible to obtain the machining tool in which the composition ratio of the metal is decreased and the composition ratio of the ceramics is increased inwardly from the surface, i.e., the machining tool has high toughness at the surface and high hardness internally.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A machining tool composed of a composite material containing ceramics and metal, comprising:

said ceramics containing at least one selected from the group consisting of carbide, nitride, and carbonitride of W, Cr, Mo, Ti, V, Zr, Hf, and lanthanoid, said metal containing at least one selected from the group consisting of Fe, Ni, Co, and alloy comprising two or more of Fe, Ni, and Co, said metal further containing at least one selected from the group consisting of Cr, Mn, V, and Ti, wherein a composition ratio of said ceramics to a composition ratio of said metal is 85:15 to 95:5 by weight, wherein said composition ratio of said ceramics is increased and said composition ratio of said metal is decreased inwardly from a surface of said machining tool, and wherein a degree of train growth of said ceramics inside said machining tool is larger than that of said ceramics in the vicinity of said surface of said machining tool.

2. The machining tool according to claim 1, wherein Vickers hardness of said surface of said machining tool is not less than 1700.

3. The machining tool according to claim 1, wherein said machining tool is a drill or a reamer.

4. A method of producing a machining tool in which a composition ratio of ceramics is increased and a composition ratio of metal is decreased inwardly from a surface of said machining tool, said method comprising the steps of:

forming a compact using mixed powder comprising ceramics powder and metal powder; sintering said compact to prepare a porous member;

impregnating said porous member with a catalyst-containing solution; and resintering said porous member impregnated with said catalyst-containing solution in an atmosphere of nitriding gas to prepare a dense sintered product, wherein said nitriding gas is introduced into a furnace at the beginning of raising temperature of said furnace in said resintering step.

5. The method of producing said machining tool according to claim 4, wherein at least one powder selected from the group consisting of carbide, nitride, and carbonitride of W, Cr, Mo, Ti, V, Zr, Hf, and lanthanoid is used for said ceramics powder and at least one powder selected from the group consisting of Fe, Ni, Co, and alloy comprising two or more of these metals is used for said metal powder to prepare mixed powder in which said ceramics powder and said metal powder are mixed in a weight ratio of 85:15 to 95:5.

6. The method of producing said machining tool according to claim 5, wherein at least one of Cr, Mn, V, and Ti is further mixed with said metal powder.

7. The method of producing said machining tool according to claim 4, wherein a catalyst in said catalyst-containing solution, is Fe, Ni, Co, Mn, Cr, Mo, Ti, or lanthanoid.

8. The method of producing said machining tool according to claim 4, wherein nitrogen is used as said nitriding gas.

9. The method of producing said machining tool according to claim 6, wherein a catalyst in said catalyst-containing solution, is Fe, Ni, Co, Mn, Cr, Mo, Ti, or lanthanoid.

10. The method of producing said machining tool according to claim 9, wherein nitrogen is used as said nitriding gas.

* * * * *